UNITED STATES PATENT OFFICE.

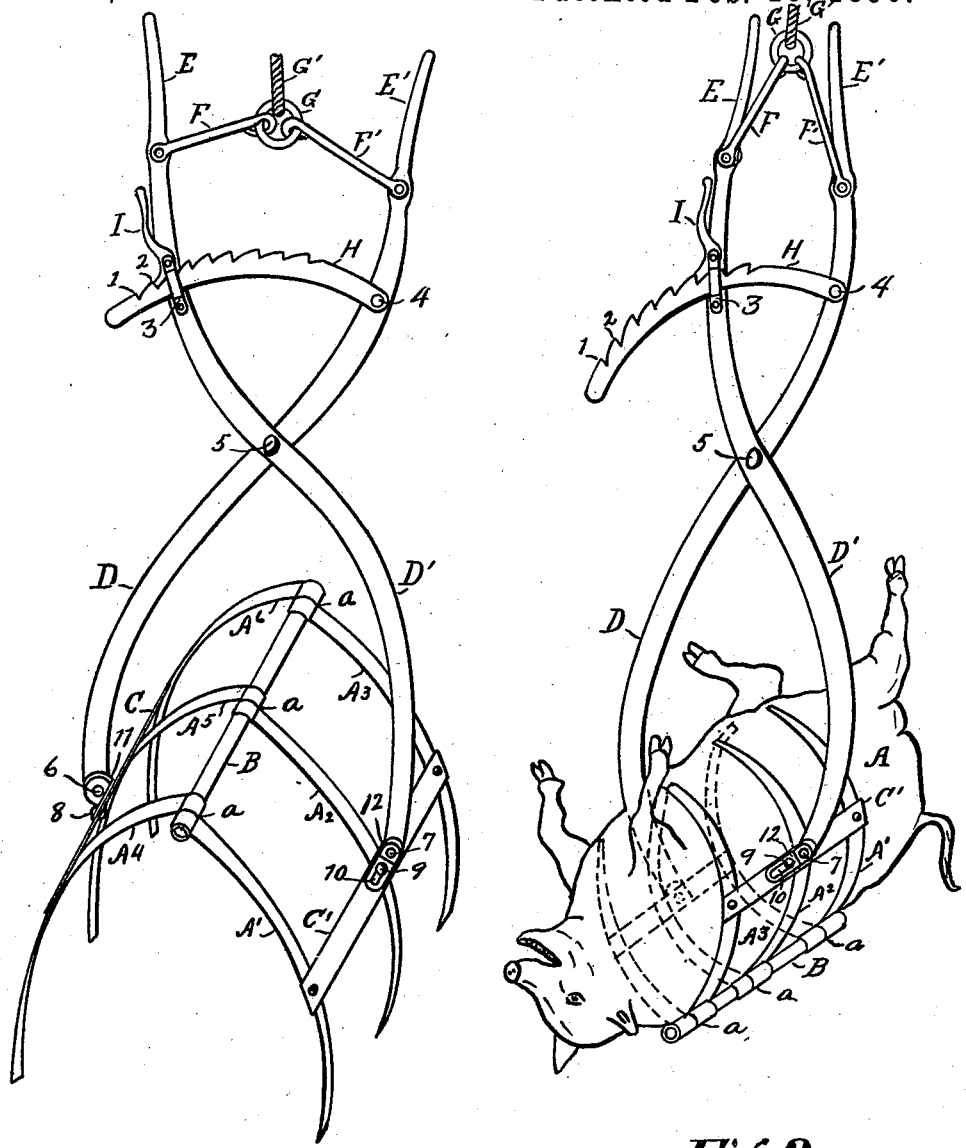

MICHAEL J. MURPHY, OF INDIANAPOLIS, INDIANA.

HOG-GRAPPLE.

SPECIFICATION forming part of Letters Patent No. 554,714, dated February 18, 1896.

Application filed September 7, 1895. Serial No. 561,778. (No model.)

*To all whom it may concern:*

Be it known that I, MICHAEL J. MURPHY, a citizen of the United States, residing at Indianapolis, in the county of Marion and State of Indiana, have invented certain new and useful Improvements in Hog-Grapples; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for grappling hogs and suspending them while being slaughtered; and it consists of a new and novel arrangement of curved hinged tines connected to crossed tongs-like levers by which hogs are secured and prevented from bruising themselves as they do when the ordinary shackle is used, and will be fully described hereinafter and pointed out in the claims.

In the process of slaughtering hogs they are driven into a small pen, a shackle is attached to one of the hind legs of one and it is drawn up by a rope or chain attached to the shackle and running over a suitable pulley to the source of power operating it. The shackle allows the hog to kick and otherwise endeavor to free itself, and in so doing bruises itself, rendering the resultant meat products less valuable by being so damaged. Besides the operation of thus suspending a hog entails an unnecessary torture to the beast. My object is to provide a means for overcoming these evils which shall be cheaply constructed, economical and durable in use, and with this in view I have constructed the apparatus shown in the accompanying drawings, in which—

Figure 1 represents a perspective view showing the grappling prongs and tongs opened ready to descend and grasp a hog; and Fig. 2 is a similar view, but with the tongs closed, locked, and a hog inclosed and turned over in the device and all suspended ready for killing.

In constructing my grapple I make the whole of metal, although some parts may be made of wood, or the tines may be cushioned on their inside surfaces or webbed when desired. The curved tines $A'\ A^2\ A^3\ A^4\ A^5\ A^6$ each have an eye at one end through which the rod B passes forming a hinge-bolt so that they have hinge-like connections at $a$. Suitable provision is made for preventing the eyes from slipping along the hinge-rod. Parallel side frame-bars C C' are secured transversely to the tines, and to these bars are secured angle pieces or ears 11 and 12, to which the crossed tongs-arms D D' are pivotally attached by rivets or bolts 6 and 7. The angle-pieces 11 and 12 each have in the part that lies against the bars C C' a slot 10 permitting adjustability, through which shouldered bolts 8 and 9 are passed connecting them pivotally to the bars. The tongs-arms are pivotally attached to each other at a suitable distance from either end of each to provide a proper amount of leverage by a rivet or bolt 5 forming a pair of tongs. The upper ends of the tongs-arms are reduced in size to form handles E E' by which the operator grasps them to guide the grapple when dropping it over a hog.

At a suitable distance below the handles a pair of toggle-arms F F' are pivotally attached, the opposite ends of the arms being coupled by a ring G to which is attached a suspending-rope G' or a chain leading over an overhead pulley in the usual manner to a means for raising and lowering the grapple and hog. At a convenient distance below the toggle a curved arm or sector H having in one of its edges, preferably the top, a number of ratchet-teeth 1 2, &c., is pivotally attached at one of its ends to one of the tongs-arms by a bolt or rivet 4, while its other end may slide through a guide-cleat 3 attached to the opposite arm. The arm having the cleat is also provided with a thumb-catch, the pawl end of which engages in the ratchet-teeth by gravity.

To make use of my invention the grapple is opened by the operator forcing the handles E E' apart, then causing the grapple to be lowered while guiding it so that the tines cover the hog. The handles are then drawn toward each other, which causes the hinged tines to close, encircling the hog. The thumb-latch engages the ratchet-teeth automatically, thus preventing the hog from dislodging the grapple. Power being at once applied, the rope draws the ring G' upward and at the same time the handle ends of the tongs firmly together, thus raising the hog from its feet. The sides of the side bars C C' are now vertically parallel to the center line of draft which permits the angle pieces or ears to swivel or turn on the axle-pins 8 and 9. The pivots 6 and 7 being below the center of the cradle thus formed, and the ears being adjusted at one side of the longitudinal center of the cradle so that the head end of the hog is the heavier, as soon as the hog is swung clear it will turn head downward on its back by its own gravity, and thus is placed in a convenient position to be stabbed and killed. After the hog is killed it is carried in the grapple to the usual place adjacent and being turned over again is lowered, the thumb-latch I disengaged, the handles E E' pushed apart, the tines open and the hog is released therefrom. When desired a rope may be attached to the heavier end of the cradle for the purpose of reversing it conveniently. Diagonal bracing-rods on the tines are used, and sometimes metallic sheets instead of tines are used, but not shown herein.

Having described my invention, what I claim as new, and desire to secure by Letters Patent, is—

1. A hog-grapple comprising in combination a set of a suitable number of curved tines one end of each of which is hinged to a rod in common with all; a bar forming a side frame permanently secured transversely to said tines on each side of the hinge between it and the points of said tines; a pair of tongs-levers pivoted between the two ends of each and having their lower ends pivotally connected each to the vertical arm of an angle-piece or ear, said ear having its horizontal arm pivotally connected to said side frame; a toggle connected to the upper portion of the said tongs-levers, a sector having a series of ratchet-teeth pivotally connected at one end to one of the said tongs-levers while its other end is slidably connected to the other of said tongs-levers; a thumb-latch arranged to engage the said ratchet-teeth automatically when the said tongs-levers are moved toward each other, substantially as and for the purpose shown and described.

2. In a hog-grapple for slaughter-houses, the combination of the pair of heavy tongs-levers D, D', having at their pincher or grasping ends a pair of skeleton grappling-cradles consisting of the frame-bars C, C', and a series of curved tines or fingers A', &c., each one of said tines having an eye $a$ in one end through which the hinged rod B is inserted connecting said tines all in two hinged halves, substantially as shown and described.

3. In a hog-grapple for slaughter-houses having the pair of levers D, D', and at their pincher or grasping ends the pair of skeleton hinged grappling-cradles; the combination with the upper arms of said levers of the curved sector H having the ratchet-teeth 1, 2, &c., one end of said sector being pivotally connected by means of the rivet or bolt 4 to one of said arms, while the other end is in slidable connection with the opposite end of said arms, having the cleat 3 loosely embracing said sector, and the thumb-catch or bolt I arranged to automatically engage the said ratchet-teeth, substantially as shown and described.

4. In a hog-grapple for slaughter-houses having the pair of levers D, D', the skeleton grappling-cradles hinged together and each pivoted to one of the levers D, D'; the upper arms of said levers having the curved sector H; the combination with the upper arms of said levers of the rings F, F' pivotally attached to said arms, and the ring G connected to free ends of said rings, substantially as shown and described.

5. In a set of hog-grappling tongs comprising two hinged halves having tines or fingers and tongs-arms connected thereto for opening and closing the two grappling parts, the combination of side-bar frames permanently attached to said halves in such manner that the side faces of said bars are perpendicular to the base when said tongs are closed; a swiveling ear attached to each of said side bars, said ears each having two arms at right angles to each other, the horizontal arms pivotally connected to said side bars having provision in each for adjusting its location longitudinally on the said bar, the vertical arm of each said ears having a pivotal connection with the lower ends of said tongs-arms, substantially as shown and for the purpose described.

In testimony whereof I affix my signature in presence of two witnesses.

MICHAEL J. MURPHY.

Witnesses:
JAS. C. BARNES,
EDWIN EATON.